Feb. 19, 1957 J. H. HAMMOND, JR., ET AL 2,782,262

MAGNETIC RECORDING METHOD

Filed Feb. 14, 1952

INVENTOR.
JOHN HAYS HAMMOND, JR.
BY ELLISON S. PURINGTON.
atty

United States Patent Office 2,782,262
Patented Feb. 19, 1957

2,782,262

MAGNETIC RECORDING METHOD

John Hays Hammond, Jr., and Ellison S. Purington, Gloucester, Mass.; said Purington assignor to said Hammond Application February 14, 1952, Serial No. 271,532

3 Claims. (Cl. 179—100.1)

Figure 1:
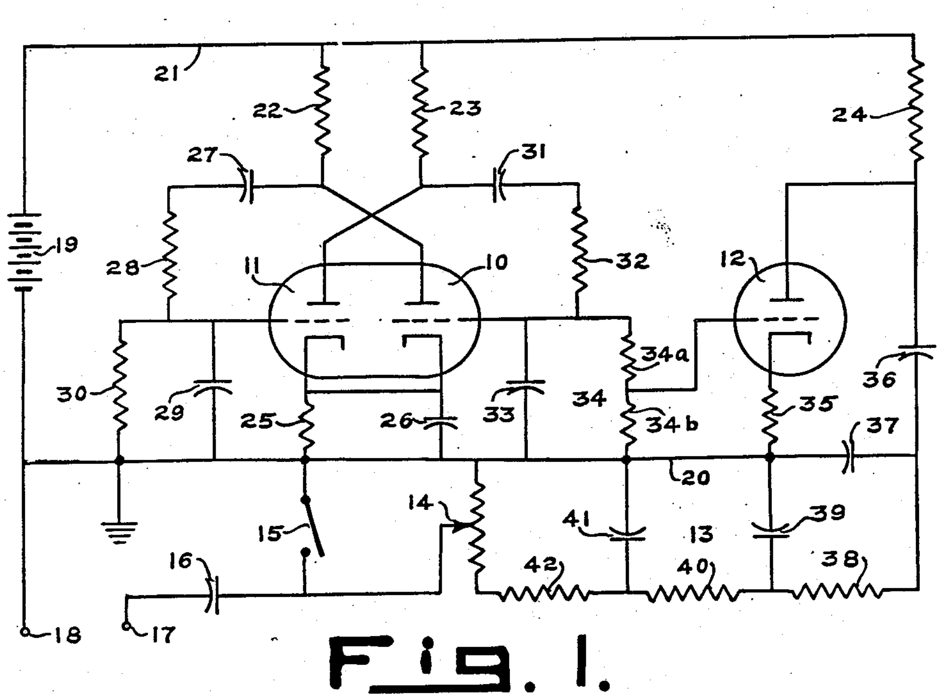

This invention relates to an electrical method of marking a magnetic tape or wire used in sound recording and reproducing circuits.

One of the objects of the invention is to facilitate the location, on the tape, of the start of a portion of a recording which it is desired to play back. Thus when a series of different musical selections are recorded in succession, it is usually required to play back each selection immediately after recording, and sometimes to play back a prior recorded selection for purposes of comparison.

It has heretofore been the practice to use visual markers such as white tape affixed to the magnetic tape at the junction between selections. In the present invention, aural markers are used. Such markers are especially useful when the recorder is remote controlled and the use of a visual marker is not possible. Such equipment is of the type known as the RT–11A Professional Magnetic Tape Recorder as described in Radio Corporation of America pamphlet IB–24739. The present method also has the advantages that the marker can be inserted electrically from a distance, in a short space of time, and without marring the tape as to appearance or performance.

At the start of each selection, before the signal is given for the recording to start, a subaudible current is passed through the recording head, with the tape in normal forward motion. The frequency is of the order of ten cycles per second, the level is of the order of ten decibels below normal maximum level for recording musical or speech selections, and the duration is of the order of five seconds. This marker is not an aural signal when the tape is moving at normal speed in playback, since the currents then produced are of subaudible frequency. But when the tape is being moved at high speed, as in "fast reverse" or "fast forward," the marker produces an audible frequency current from the reproducing head, of the order of 50 to 1000 cycles per second. Under these conditions, signals due to the musical selections on the tape are of extremely high frequency and produce very little audibility. It is to be noted that the tape is usually lifted away from the magnetic heads during this high speed motion, but nevertheless there is sufficient pickup from the marker signal so that the audible marker note stands out clearly and distinctly.

After the recording of a selection and it is desired to play back, the drive for the tape is set into "fast reverse," and the output of the reproducing head is examined by its amplifier and headphones. When the audible marker tone is heard, the drive is set for "fast forward," and the second transit of the marker is at slower speed, and the tone heard from the marker is lower in frequency. Thus by "jockeying" the tape back and forward, the marker tone is run down to very low frequency and the tape can be stopped with the marker at the reproducing head position. The selection is then played back by setting the tape drive for normal forward motion and causing the reproducing head to drive its amplifier and loud speaker.

It is obvious that the start of other selections can be located by counting the transit of markers. Further it will appear obvious to those skilled in the art that the markers could be used in an automatic device for playing any of a number of selections, in accordance with a push button selector. Further since the marker is of subaudible frequency, it is obvious that it can be mixed in with the selections at any point, and its use is not limited to the location of the start of the program. Other applications of the marker will be apparent to those skilled in the art.

The invention also consists in certain new and original features of construction and combinations of parts hereinafter set forth and claimed.

Figure 2:
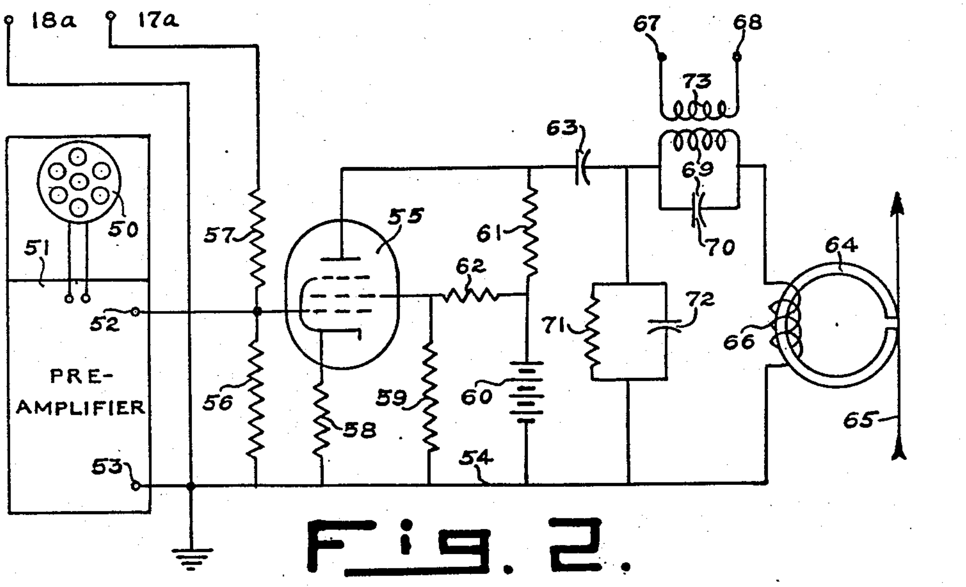

The nature of the invention as to its objects and advantages, the mode of its operation and the manner of its organization, may be better understood by referring to the following description, taken in connection with the accompanying drawing forming a part thereof, in which Fig. 1 is a schematic diagram showing one form of circuit for producing a subaudible frequency marker signal in accordance with this invention; and Fig. 2 is a schematic diagram showing one form of a circuit for impressing the marker signal onto a magnetic tape.

Like reference characters denote like parts in the several figures of the drawing.

In the following description parts will be identified by specific names for convenience, but they are intended to be generic in their application to similar parts.

In Fig. 1, the subaudible frequency is generated by use of a pair of triodes 10, 11, which may be conveniently in one envelope; it is amplified by use of a triode 12; it is purified by reduction of harmonics by a filter 13; it is controlled as to its insertions into the recorder system by a potentiometer 14 and a switch 15. Thus when the potentiometer 14 is advanced as indicated and the switch 15 is opened as indicated, the marker signal is impressed through a capacitor 16 upon the output terminals 17 and 18.

More specifically, the circuit of Fig. 1 is driven from a source of filament current to heat the cathodes of the triodes 10, 11, 12, these means for heating being not shown; also it is driven from a "B" battery 19 or equivalent, the negative end of which is connected to a ground line 20, and the positive end is connected to a high voltage line 21. The anodes of triodes 10, 11 and 12 are connected to line 21 through resistors 22, 23, 24 respectively; the cathodes of triodes 10 and 11 are joined together and connected to ground through bias resistor 25 paralleled by high capacity capacitor 26. The anode of triode 10 is connected to drive the grid of triode 11 by a four element network, with elements 27, 28, 29, 30. Thus capacitor 27 in series with resistor 28 is connected from the anode of triode 10 to the grid of triode 11, and capacitor 29 in parallel with resistor 30 is connected from the grid of triode 11 to ground line 20. Similarly the anode of triode 11 is arranged to drive the grid of triode 10 by a four element network with series capacitor 31 and resistor 32, and parallel capacitor 33 and resistor 34. The resistor 34 is suitably tapped, dividing it into two parts **34*a* and 34*b*, and the tap connection is connected to the grid of triode 12. The cathode of triode 12 is positively biased by resistor 35 connected between the cathode and ground line, and the conditions are such that the triode 12** does not draw grid current.

The plate of amplifier triode 12 is connected through capacitor 36 to the low pass filter 13 of the RC ladder type, with series arms resistors 38 and 40 and shunt arms to ground line 20, comprising capacitors 37, 39, 41. A resistor 42 is connected from the junction of resistor 40 and capacitor 41 to the potentiometer 14, the other end of which is connected to ground line 20. The movable arm of the potentiometer 14 is connected to one side of switch 15, the other side of which is connected to ground line 20, and is also connected through capacitor 16 to output terminal 17.

The oscillator system associated with triodes 10 and 11 is of a symmetrical type. For use with a 6SN7GT duo-triode oscillator tube, with a driving voltage 19 of about 250 volts, the following is a typical set of constants for the oscillator.

| Element | Value, ohms | Element | Value, microfarads |
|---|---|---|---|
| 25 | 560 | 26 | 100 |
| 22, 23 | 27,000 | 27, 31 | .05 |
| 28, 32 | 330,000 | 29, 33 | .25 |
| 30, 34 | 66,000 | | |

Thus elements 27 and 28, likewise elements 29, 30 are of the same numerical impedance at the approximate desired frequency of operation of 10 cycles. At this frequency, the voltage transfer from anode of 10 to the grid of 11 is a maximum, the two voltages are in phase, with the grid voltage 9% of the anode voltage sufficient to sustain oscillation. By symmetry, the system will oscillate at a frequency which makes the two plates exactly out of phase and the two grids exactly out of phase. Since the external output impedance of each triode is substantially a pure resistance, with the resistor 28 being very large in comparison with resistor 22, it follows that voltage of the anode of a triode is out of phase with the voltage of the grid. Therefore the system oscillates at the desired frequency for which the voltage of a grid of a triode is in phase with the voltage of the anode of the other triode.

With the triode 12 of the 645 type, typical constants for the balance of the circuit are as follows;

| Element | Value, ohms | Element | Value |
|---|---|---|---|
| 24 | 47,000 | 16, 36 | .25 microfarad. |
| 35 | 1,000 | 37, 41 | .1 microfarad. |
| 38, 40 | 470,000 | 39 | .2 microfarad. |
| 42 | 100,000 | 34a | 19,000 ohms. |
| 14 | 250,000 | 34b | 47,000 ohms. |

This system will deliver a voltage between terminals 17 and 18 of substantially the desired frequency and highly free from audible harmonics, provided the potentiometer is advanced away from the zero position and the switch 15 is open.

In Fig. 2 is shown a simplified diagram of a tape recording circuit to illustrate a manner of using the circuit of Fig. 1. A microphone 50 or other source for audio current, is connected to a conventional preamplifier 51 with output terminals 52 and 53, the latter being connected to a ground line 54. Preferably the internal impedance of the preamplifier is high as viewed from terminals 52 and 53, and the construction should be such that terminal 52 may be brought to ground potential without disturbing the operation of the preamplifier.

Terminal 52 is connected to the first or control grid of a pentode 55, which in turn is connected to ground line 54 by a resistor 56 and is connected through a resistor 57 to a terminal 17a, ground line 54, is connected to a terminal 18a. When the circuit of Fig. 1 is to be used in connection with that of Fig. 2, the terminals 17 and 17a and likewise the terminals 18 and 18a will be joined together. Thus a mixing system is provided so that the control grid of pentode 55 can be driven both from the normal signal at terminals 52, 53 and the marking signal at terminals 17a, 18a.

The pentode 55 is connected in a conventional manner as an amplifier, with the cathode connected to the third grid, with a cathode to ground resistor 58, second or screen grid to ground resistor 59, B battery or equivalent 60, anode resistor 61, screen feed resistor 62, output blocking capacitor 63. The recording head 64 is provided across the gap of which passes the recording tape 65 driven by means not shown. The recording head 64 with a winding 66 is driven from the signal and marker output of pentode 55 delivered through capacitor 63, and also from the high frequency bias source provided at two terminals 67, 68. One end of the winding 66 of the recording head is connected to ground line 54, the other end is connected through inductor 69 paralleled by capacitor 70 to the output end of capacitor 63, which in turn is connected through resistor 71 paralleled by capacitor 72 to ground line 54, inductor 69 is inductively coupled to an inductor 73 the ends of which are connected to bias terminals 67, 68. Signal and marker currents pass through capacitor 63, inductor 69 and to a lesser degree capacitor 70, through the winding 66, thence to ground line 54. The bias voltage at terminals 67, 68 produces a similar voltage at the end of inductor 69, resonated by capacitor 70. Bias currents flow from one end of inductor 69 through the winding 66, thence along ground line 59, then through capacitor 72 and to a lesser degree through resistor 71 back to the other end of the inductor. Also to a lesser degree the bias current passes through the circuit of the amplifier 55.

Thus there is provided a system by which the recording head is activated by the bias source, and the signal source in the usual manner, and is provided with terminals 17a and 18a and resistor 57 for purposes of injecting a marker signal.

In operation with terminals 17 and 18 of Fig. 1 joined to terminals 17a and 18a of Fig. 2, the switch 15 may be normally closed and potentiometer 14 set at a suitably advanced position. A marker signal is produced on the tape by opening switch 15 for the desired length of time. Or as an alternative, the switch 15 may be left open and the potentiometer 14 normally set at zero. A marker would then be inserted by advancing the potentiometer 14 for the desired length of time and then restoring it to zero position. The former method of operation is simpler, but the latter method will be preferable if it is necessary to be free from slight transient effects due to abrupt insertions of an A. C. voltage into the system.

Although only a few of the various forms in which this invention may be embodied have been shown herein, it is to be understood that the invention is not limited to any specific construction but might be embodied in various forms without departing from the spirit of the invention or the scope of the appended claims.

What is claimed is:

1. The method of determining a selected position on a magnetic record medium adapted to have selections recorded thereon while said medium is being driven at a predetermined speed comprising the steps of recording on said record medium a marking signal adapted to produce a tone of sub-audible frequency when reproduced at said predetermined speed while said record is being driven at said predetermined speed, reproducing signals recorded on said record medium while said record medium is being driven at a speed higher than said predetermined speed, said marking signal being audible at said higher speed, repeatedly reversing the direction in which said record medium is being driven at said higher speed upon each reproduction of said marking signal, incrementally reducing said higher speed upon each of said reversals, and stopping the motion of the record when said marking signal is reproduced as a tone of low audible frequency.

2. The method of magnetic recording and reproduction of magnetic records having selections recorded thereon which are reproducible at a predetermined record driving speed whereby a selected position on a record is determinable comprising the steps of generating a marking signal of sub-audible frequency, recording said signal on said selected position on said record while said record is being driven at said predetermined speed, reproducing the signals recorded on said record while said record is being driven at a speed at which said marking signal is audible, said last-named speed being substantially faster than said predetermined speed, reversing the direction in which said record is driven repetitively upon each reproduction of said marking signal, driving said record at incrementally reduced speeds upon each reversal of direction, and stopping the motion of said record when said marking signal is reproduced as a tone which is barely audible.

3. The method of magnetic recording and reproduction of a magnetic record recorded on an elongated magnetic record medium at a predetermined driving speed comprising the steps of generating a marking signal of sub-audible frequency, recording said marking signal while said record is being unwound and advanced in a forward direction at said predetermined speed, recording a selection on said record medium following said marking signal, reproducing signals recorded on said record medium, rewinding said record medium in a reverse direction during said last-named step, then unwinding said record medium during said step of reproducing said signals, said winding and rewinding steps being separately initiated repeatedly upon alternate, successive reproductions of said marking signal, each of said repeated rewindings and unwindings of said medium being at an incrementally lower speed, the highest of said incrementally lower speeds being higher than said predetermined speed, said marking signal being reproducible as audible tones of incrementally lower frequencies, and stopping the motion of said medium when said marking signal is reproduced as a barely audible tone, thereby locating the position on said record medium preceding said recorded selection.

References Cited in the file of this patent

UNITED STATES PATENTS

| | | |
|---|---|---|
| 2,346,905 | Chedister | Apr. 18, 1944 |
| 2,396,409 | Berzer | Mar. 12, 1946 |
| 2,529,097 | Mullin | Nov. 7, 1950 |
| 2,558,669 | Breen | June 26, 1951 |